United States Patent
Cheng et al.

(10) Patent No.: US 11,698,499 B2
(45) Date of Patent: Jul. 11, 2023

(54) LOW SHRINK AND SMALL BEND PERFORMING DROP CABLE

(71) Applicant: Corning Research & Development Corporation, Corning, NY (US)

(72) Inventors: Xiaole Cheng, Painted Post, NY (US); Jason Clay Lail, Conover, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 17/540,679

(22) Filed: Dec. 2, 2021

(65) Prior Publication Data
US 2022/0091353 A1 Mar. 24, 2022

Related U.S. Application Data

(62) Division of application No. 16/891,604, filed on Jun. 3, 2020, now Pat. No. 11,204,473.

(60) Provisional application No. 62/858,194, filed on Jun. 6, 2019.

(51) Int. Cl.
G02B 6/44 (2006.01)

(52) U.S. Cl.
CPC ......... G02B 6/4432 (2013.01); G02B 6/4436 (2013.01)

(58) Field of Classification Search
None
See application file for complete search history.

(56) References Cited

U.S. PATENT DOCUMENTS

| | | | |
|---|---|---|---|
| 6,801,695 B2 | 10/2004 | Lanier et al. | |
| 6,925,235 B2 | 8/2005 | Lanier et al. | |
| 8,705,921 B2 | 4/2014 | Blazer et al. | |
| 9,651,753 B2 | 5/2017 | Hurley et al. | |
| 10,131,774 B2 | 11/2018 | Bringuier et al. | |
| 10,663,682 B2 | 5/2020 | Cheng et al. | |
| 2003/0035635 A1 | 2/2003 | Chastain et al. | |
| 2003/0128941 A1 | 7/2003 | Lanier et al. | |
| 2004/0240808 A1 | 12/2004 | Rhoney et al. | |
| 2005/0041941 A1 | 2/2005 | Lanier et al. | |

(Continued)

FOREIGN PATENT DOCUMENTS

| | | | |
|---|---|---|---|
| AU | 2008248141 A1 | 11/2008 | |
| EP | 1326113 A2 | 7/2003 | |

OTHER PUBLICATIONS

International Search Report and Written Opinion of the International Searching Authority; PCT/US20/035499; dated Aug. 27, 2020; 12 Pages; European Patent Office Office.

*Primary Examiner* — Jerry Rahll
(74) *Attorney, Agent, or Firm* — William D. Doyle

(57) ABSTRACT

An optical fiber drop cable. The optical fiber drop cable includes at least one optical fiber and at least one inner tensile element wound around the at least one optical fiber having a laylength of at least 200 mm. The optical fiber drop cable also includes an interior jacket disposed around the at least one inner tensile element and an exterior jacket having an inner surface and an outer surface. The optical fiber drop cable further includes at least one outer tensile element disposed between the interior jacket and the outer surface of the exterior jacket. Each of the at least one outer tensile element has a laylength of at least 1 m. The exterior jacket includes at least one polyolefin, at least one thermoplastic elastomer, and at least one high aspect ratio inorganic filler. The exterior jacket has an averaged coefficient of thermal expansion of no more than 120 $(10^{-6})$ m/mK.

9 Claims, 3 Drawing Sheets

(56) References Cited

U.S. PATENT DOCUMENTS

| | | |
|---|---|---|
| 2017/0357069 A1 | 12/2017 | Messer et al. |
| 2019/0154934 A1 | 5/2019 | Cheng et al. |

LOW SHRINK AND SMALL BEND PERFORMING DROP CABLE

CROSS-REFERENCED TO RELATED APPLICATIONS

This application is a divisional of U.S. patent application Ser. No. 16/891,604 filed Jun. 3, 2020, which claims the benefit of priority under 35 U.S.C. § 119 of U.S. Provisional Application Ser. No. 62/858,194 filed on Jun. 6, 2019, the content of each of which is relied upon and incorporated herein by reference in its entirety.

BACKGROUND

The disclosure relates generally to cables and more particularly to cables having outer tensile elements disposed between an inner and outer jacket or within the outer jacket. Cables, such as power transmission cables, telephone cables, optical fiber cable, etc., are used to transmit electricity and/or data over distance. In order to do so, the cables have to be strung across land and/or buried in the ground between electricity/data sources and delivery points. Because of their exposure to hot and cold temperatures, the cable jacket expands and contracts, which causes cable buckling. Cable buckling attenuates the signal traveling along the cable and can lead to premature deterioration of the cable.

SUMMARY

In one aspect, embodiments of an optical fiber drop cable. The optical fiber drop cable includes at least one optical fiber and at least one inner tensile element. The at least one inner tensile element is wound around the at least one optical fiber at a laylength of at least 200 mm along a longitudinal axis of the optical fiber drop cable. The optical fiber drop cable also includes an interior jacket disposed around the at least one inner tensile element and an exterior jacket having an inner surface and having an outer surface that defines an outermost surface of the drop cable. The optical fiber drop cable further includes at least one outer tensile element that is disposed between the interior jacket and the outer surface of the exterior jacket. Each of the at least one outer tensile element has a laylength of at least 1 m along the longitudinal axis of the optical fiber drop cable. The exterior jacket includes at least one polyolefin, at least one thermoplastic elastomer, and at least one high aspect ratio inorganic filler. The exterior jacket has an averaged coefficient of thermal expansion of no more than 120 $(10^{-6})$ m/mK.

In another aspect, embodiments of a method of manufacturing a drop cable. In the method, a buffer tube containing at least one optical fiber is moved along a processing line at a rate of at least 200 m/min. At least one inner tensile element is wound around the buffer tube. The inner tensile element has a laylength of at least 200 mm. An interior jacket is extruded around the at least one inner tensile element. At least one outer tensile element is run along the longitudinal axis of the interior jacket, and an exterior jacket is extruded over or around the at least one outer tensile element. The exterior jacket includes a polyolefin component, a thermoplastic elastomer component, and an inorganic filler component.

In still another aspect, embodiments of a cable including at least one conductor, a buffer tube surrounding the at least one conductor, and a first plurality of inner tensile elements. The first plurality of inner tensile elements are wound around the buffer tube at a laylength of at least 500 mm. The cable also includes an interior jacket disposed around the first plurality of inner tensile elements, a second plurality of outer tensile elements, and an exterior jacket having an outer surface defining the outermost surface of the cable. The exterior jacket includes from 30 wt % to 60 wt % of at least one polyolefin, from 30 wt % to 60 wt % by weight of at least one thermoplastic elastomer, and from 5 wt % to 30 wt % by weight of at least one inorganic filler. The second plurality of outer tensile elements is disposed between the outer surface of the exterior jacket and the interior jacket.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and operation of the various embodiments.

DETAILED DESCRIPTION

Figure 1:
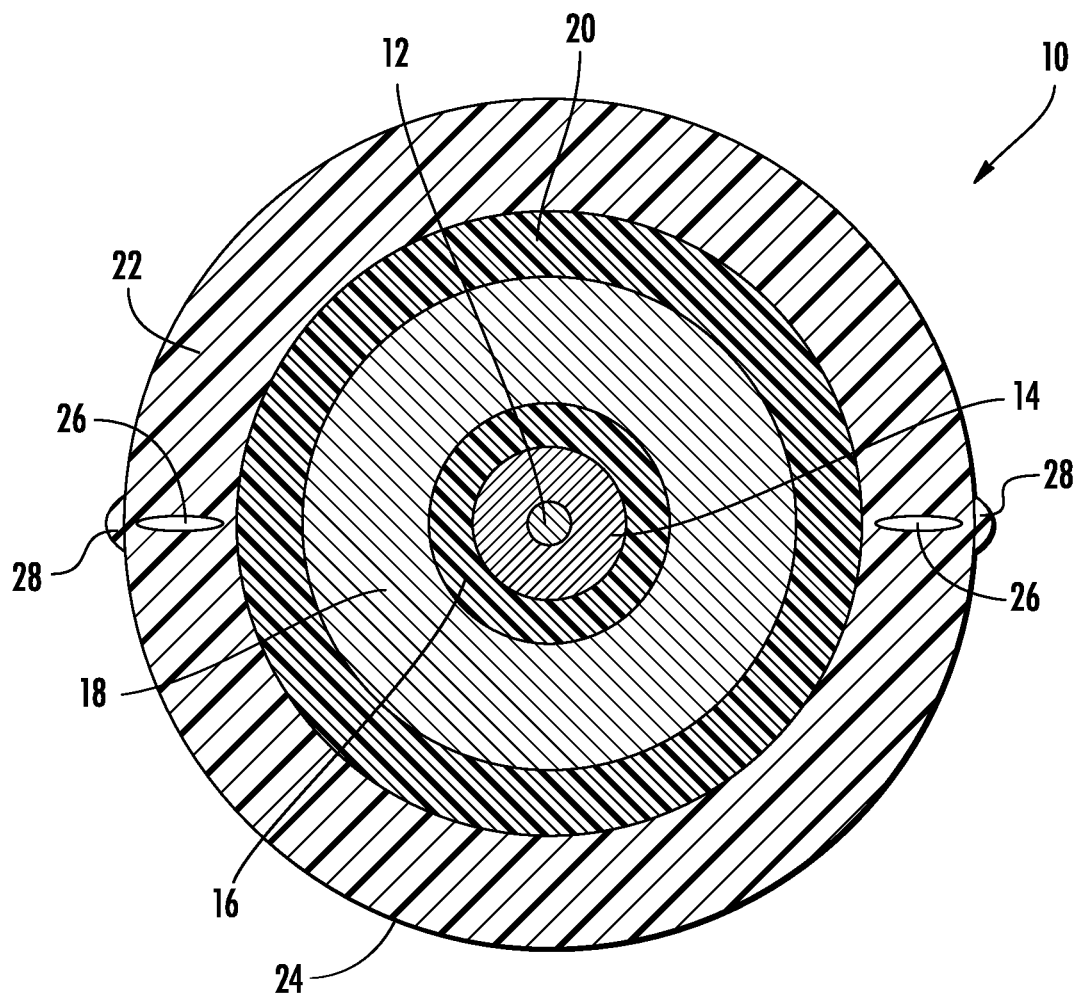
FIG. 1 depicts a cross section of a drop cable having flexible outer tensile elements between an inner and outer jacket, according to an exemplary embodiment.

Referring generally to the figures, various embodiments of an optical fiber cable having outer tensile elements disposed between an inner and outer jacket or within the outer jacket as well as inner tensile elements wrapped around a conductor are disclosed herein. In particular, the optical fiber cable construction disclosed herein includes an exterior jacket comprised of a material with antibuckling properties and outer tensile elements and inner tensile elements that can be applied at high speeds. In previous optical fiber cable constructions, strands of glass fibers were wound around an inner jacket of an optical fiber cable to reduce the occurrence of cable buckling, but these strands had to be applied at low speed. Further, the strands of glass fibers tended to be stiff, which causes signal attenuation when the optical fiber cable is bent. In the presently disclosed cable construction, the exterior jacket of the optical fiber cable includes one or more thermoplastic elastomers and high aspect ratio fillers to prevent cable buckling. Further, outer tensile elements and inner tensile elements that are softer and more flexible than conventional glass strands provide resistance to cable buckling. Thus, the disclosed optical fiber cable construction provides the synergistic effects of improved antibuckling performance, improved bend performance, and improved processing speeds. While the discussion focuses on the use of the exterior jacket, outer tensile elements, and the inner tensile element in an optical fiber cable, particularly a drop cable, the exterior jacket, the outer tensile elements, and the inner tensile elements can also be utilized in the context of other cables, such as other electrical and telecommunication cables.

Because optical fiber cables are often deployed in outdoor environments, they may be exposed to temperature extremes. For example, optical fiber cables are deployed in environments where temperatures reach as low as −40° C. and/or as high as 70° C. In general, cold temperatures cause the cable jacket to contract and/or become stiff, and warm temperatures cause the cable jacket to expand. In certain conventional cables, the cable jacket is made primarily of polyolefins, such as polyethylene (e.g., high density, medium density, low density, and/or linear low density) or polypropylene, which expand and contract to a greater extent than the optical fiber. The difference in expansion and contraction between the cable jacket and the optical fiber creates stresses along the length of the cable, which can cause the cable to loop or twist. This looping and twisting is known as buckling, and such buckling can cause signal attenuation and/or premature degradation of the cable. Thus, antibuckling elements, such as strands of glass fibers, are typically wound around the buffer tube of the optical fiber to reduce buckling. However, as mentioned above, strands of glass fibers are relatively stiff, which impairs bend performance, and must be applied at relatively low processing speeds, e.g., at cable line speeds of about 20 m/min.

As discussed herein, bend performance is measured by wrapping a cable around a mandrel a specified number of times and then measuring the loss of a transmitted signal. Tests of this variety are defined in ICEA 717 and IEC-60794-1-21, Method E11. In general, the size of the cable determines the size of the mandrel used for testing. The particular test used herein considers a drop cable wrapped around a 60 mm mandrel three times. Signals are passed through the optical fiber at various wavelengths, such as 1625 nm, 1550 nm, and 1310 nm, and the signal attenuation (i.e., loss) resulting from the bending of the cable around the mandrel is measured. Generally, using a mandrel with a smaller diameter for a given cable width will result in higher attenuation or signal loss as a result of the tighter bend in the cable to wrap it around the mandrel. For the purposes of the test considered herein, the signal attenuation is measured with respect to the 1550 nm wavelength. A passing performance for the cable in such a bend performance test is a signal loss of less than 0.05 dB. As will be discussed more fully below, the optical fiber cable construction disclosed herein addresses the issues of bend performance, antibuckling, and processing speeds through use of an inner tensile element more flexible than conventional impregnated glass fiber tensile elements and through the use of a polymeric jacket that includes a thermoplastic elastomer component and a high aspect ratio filler component.

FIG. 1 provides an exemplary embodiment of a drop cable 10. At the center of the drop cable 10 is a conductor, which is an optical fiber 12 in the embodiment depicted. As used herein, a "conductor" is an element that conducts electrical or telecommunication signals. In the embodiment of FIG. 1, the optical fiber 12 is surrounded by a buffer tube 14 such that the buffer tube 14 is essentially a sheath for the optical fiber 12. Such an optical fiber 12 and buffer tube 14 arrangement may also be referred to as a "tight-buffered fiber." Wrapped around the buffer tube 14 are one or more inner tensile elements 16. The inner tensile elements 16 reinforce the tensile strength of the drop cable 10 when stretched. The inner tensile elements 16 include strands of yarn, ribbon, and/or banding that are wound (e.g., helically wound) around the buffer tube 14. In a particular embodiment, the inner tensile elements 16 are one to ten strands of yarn, ribbon, and/or banding. As depicted in FIG. 1, the inner tensile elements 16 form a continuous layer around the circumference of the buffer tube 14. In a particular embodiment, the continuous layer is created by helically winding nine strands of yarn around the buffer tube 14. In other embodiments, a discontinuous layer is provided around the circumference of the buffer tube 14 by using less than nine yarns. In other embodiments, the drop cable 10 may include a "bare fiber," which is an optical fiber 12 without a buffer tube 14. Further, in embodiments, the drop cable 10 may include more than one optical fiber 12, e.g., more than one bare fiber or more than one optical fiber 12 in a buffer tube 14. In such embodiments, the inner tensile elements 16 are wound around the bare fiber(s) or the buffer tube 14 containing the multiple optical fibers 12.

As mentioned briefly above, the inner tensile elements 16 are more flexible than the conventionally-used strands of glass fibers. In a particular embodiment, the inner tensile elements 16 are one or more strong and flexible strands (e.g., of yarn, ribbon, banding, etc.) made from filaments of at least one of an aramid, a carbon fiber, an ultra-high molecular weight polyethylene (UHMWPE), an ethylene chlorotrifluoroethylene (ECTFE), a polybenzimidazole (PBI), a perfluoroalkoxy (PFA), a polytetrafluoroethylene (PTFE), a polyphenylene sulfide (PPS), a liquid crystal polymer (LCP), or a polyphenylene benzobisoxazole (PBO). In embodiments, the strands are made up of loose filaments, and in other embodiments, the filaments are impregnated or coated with a binder, such as an ethylene vinyl acetate, polyamide, or polyester hot melt. In an experimental embodiment discussed in more detail below, the inner tensile elements 16 were selected to contain loose aramid filaments. In embodiments, the inner tensile elements 16 have a mass length of from 500 dtex to 2500 dtex (dtex being grams per 10,000 m).

Surrounding the inner tensile elements 16 is an interior jacket 18. In embodiments, the interior jacket 18 is a polymer or polymer blend containing flame retardant additives. In a more specific embodiment, the flame retardant additives are non-corrosive, i.e., they do not contain halogens. Such polymers may also be referred to as "low smoke, zero halogen" or "LSZH" polymers. In embodiments, the interior jacket 18 is extruded around the inner tensile elements 16.

In the embodiment of FIG. 1, a plurality of outer tensile elements 20 extend straight along the longitudinal axis of the drop cable 10 around the interior jacket 18. As used herein, "straight" means that the outer tensile elements have a laylength of at least 1 m. That is, the outer tensile elements 20, in embodiments, may be wound along the longitudinal axis of the drop cable 10 but at relatively long (≥1 m) laylengths. In other embodiments, there may be no winding of the outer tensile elements 20 along the longitudinal axis of the drop cable 10, which means that the outer tensile elements 20 may be applied to the drop cable without the need for winding equipment. Advantageously, straight outer tensile elements 20 (i.e., having a laylength of ≥1 m or absent winding) allow for the strands to be applied at a faster line speed than short laylength wrapped or stranded strands.

Like the inner tensile elements 16, the outer tensile elements 20 also comprise a fiber that is relatively more flexible than conventional glass fibers and/or impregnated glass fibers. In embodiments, the outer tensile elements 20 comprise one or more strong and flexible strands (e.g., of yarn, ribbon, banding, etc.) made from filaments of at least one of an aramid, a carbon fiber, an UHMWPE, an ECTFE, a PBI, a PFA, a PTFE, a PPS, a LCP, or a PBO. Further, in embodiments, the strands are made up of loose filaments, and in other embodiments, the filaments are impregnated or coated with a binder, such as an ethylene vinyl acetate, polyamide, or polyester hot melt. In embodiments, the outer tensile elements 20 have a mass length of from 500 dtex to 2500 dtex (dtex being grams per 10,000 m). In the embodiment of FIG. 1, the outer tensile elements 20 are provided around the entire circumference of the interior jacket 18 so as to form a layer of outer tensile elements 20. In an embodiment, a layer may comprise eight outer tensile elements 20 surrounding the interior jacket 18. However, in other embodiments, more or fewer outer tensile elements 20 can be used. In particular embodiments, the number of outer tensile elements 20 is from one to twenty. The outer tensile elements 20 of the present disclosure are distinguished from other components providing tensile strength along the longitudinal axis, such as tensile rods (e.g., glass reinforced plastic rods), wires (e.g., braided steel wire), or glass fibers (as discussed above), that are less flexible than the outer tensile elements 20 as described.

In the embodiment of FIG. 1, an exterior jacket 22 is provided outside of the outer tensile elements 20. The exterior jacket 22 has a surface 24 that defines the outermost surface of the drop cable 10. Embedded in the exterior jacket 22 is one or more access elements, such as strips 26 of a dissimilar polymer (e.g., strips of polypropylene embedded in a polyethylene jacket) or a ripcord. Additionally, in the embodiment shown in FIG. 1, the exterior jacket 22 includes locating ridges 28 that provide a visual and tactile indication of the location of the ripcords 26.

Figure 2:
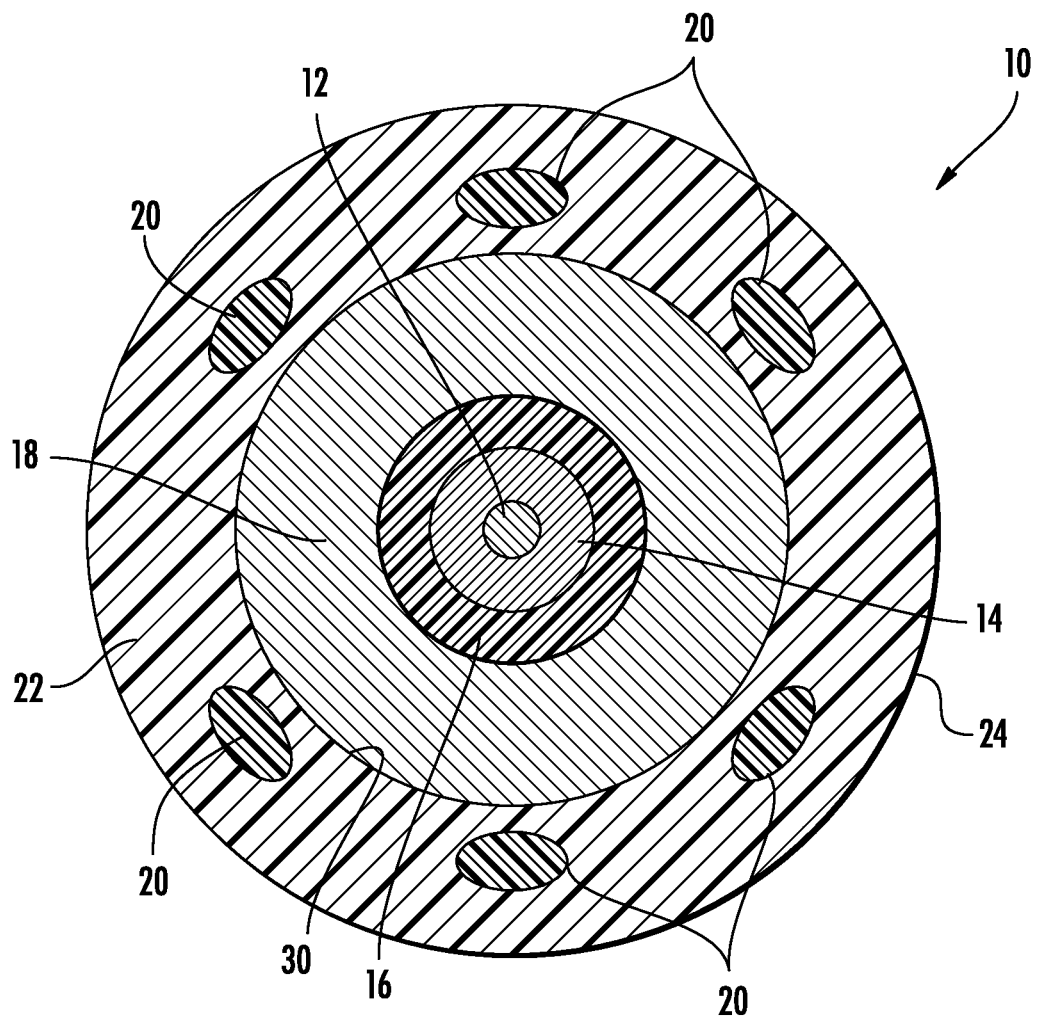
FIG. 2 depicts a cross section of a drop cable having flexible outer tensile elements embedded within an outer jacket, according to an exemplary embodiment.

FIG. 2 depicts another embodiment of the drop cable 10. In the embodiment of FIG. 2, the drop cable 10 includes optical fiber 12 with tight buffer tube 14. Inner tensile elements 16 are wrapped around the buffer tube 14, and an interior jacket 18 is disposed around the inner tensile elements 16. Instead of providing the outer tensile elements 20 around the interior jacket 18, the outer tensile elements 20 in the embodiment of FIG. 2 are embedded in the exterior jacket 22. The exterior jacket 22 includes an inner surface 30 in contact with the interior jacket 18. The outer surface 24 of the exterior jacket 22 and the inner surface 30 define a thickness therebetween. The outer tensile elements 20 are disposed between the outer surface 24 and the inner surface 30 and within the thickness. As depicted in FIG. 2, the exterior jacket 22 includes six outer tensile elements 20 embedded therein. In embodiments, the exterior jacket 22 contains from one to twenty outer tensile elements 20. As with the previous embodiment, the outer tensile elements 20 extend straight along the longitudinal axis of the drop cable 10. While not depicted in the embodiment of FIG. 2, the exterior jacket 22 may also include an access element, such as a strip 26 of dissimilar polymer or a ripcord, as well as a locating ridge 28.

In still another embodiment, the outer tensile elements 20 may be located at an interface between the inner jacket 18 and the exterior jacket 22. That is, the outer tensile elements 20 do not form a continuous layer as depicted in FIG. 1, but the outer tensile elements 20 are applied in such a way that they contact the inner jacket 18 and are partially embedded in the exterior jacket 22. In such embodiments, each outer tensile element 20 may be separated from its adjacent outer tensile elements 20 by the material comprising the exterior jacket 22.

As discussed above, the synergistic combination of the exterior jacket 22, the inner tensile elements 16, and the outer tensile elements 20 allow for improved processing line speeds and buckling resistance, while maintaining or improving bend performance. As will be discussed more fully below, the exterior jacket 22 is made of polymer composition having a low coefficient of thermal expansion (CTE), which provides the antibuckling properties. In this way, the inner tensile elements 16 and outer tensile elements 20 do not need to provide resistance to buckling, allowing the use of a more flexible material. Advantageously, the materials used for the inner tensile elements 16 and outer tensile elements 20 are able to be wound around the buffer tube 14 and along the interior jacket 18 at much faster rates than, e.g., strands of impregnated glass fibers. As such, the inner tensile element 16 has a longer laylength, which reduces the impact of the inner tensile element 16 on the bend performance of the drop cable 10.

Figure 3:
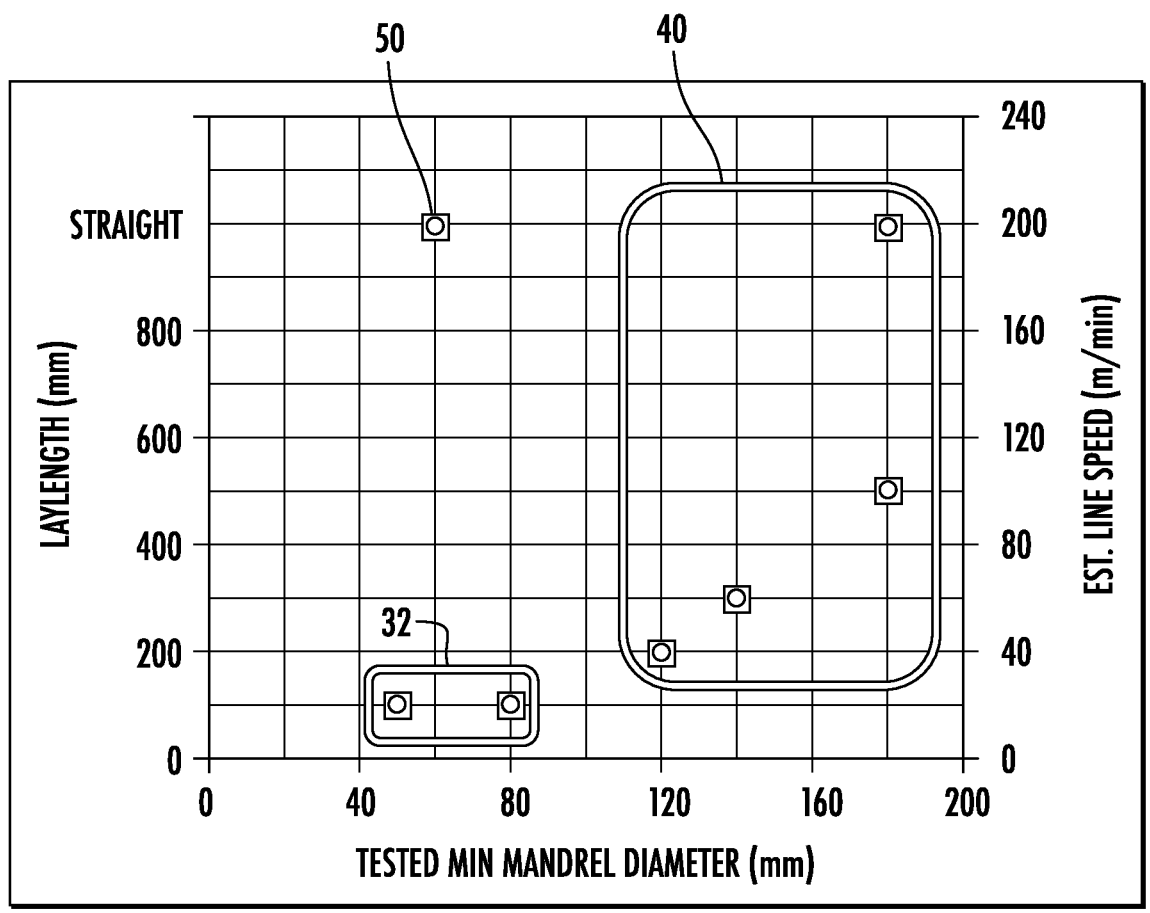
FIG. 3 is a chart relating the laylength, mandrel test diameter, and estimated line speed for producing a drop cable using various components for drop cable.

FIG. 3 provides a chart depicting the relationship between laylength, the estimated line speed (i.e., the rate at which the inner tensile elements 16 are applied to the buffer tube 14), and the minimum mandrel diameter to achieve a successful bend test. In general, strands of the inner tensile element 16 are wrapped around the buffer tube 14 in a helical fashion. Hence, the laylength of a strand refers to length of cable over which the strand completes one complete revolution of the cable circumference. Because the cable is continuously moving along the processing line as the strand is applied, the length of cable that passes before a complete revolution is made will depend on how fast the cable is moving. Thus, generally, the laylength and the line speed are directly proportional, and so, a large laylength corresponds to a faster cable processing line speed. In particular, the estimated line speed is equal to the product of the laylength and the rpm for winding the inner tensile elements 16 around the buffer tube 14. In embodiments in which the outer tensile elements 20 are wound around the inner jacket 18, the foregoing discussion of laylengths and inner tensile elements 16 applies with equal force to the outer tensile elements 20 and their laylength.

As indicated in the chart of FIG. 3, a laylength of 1 m or higher is considered "straight," i.e., the helical nature of the wrapping pattern is slight. Further, a shorter laylength corresponds to a slower processing line speed. However, the laylength may need to be within a certain range in order to provide desired bend performance. That is, a shorter laylength is generally associated with improved bend performance. However, that must be balanced against considerations of economical production, which generally dictates faster processing line speeds and longer laylengths.

For example, box 32 includes two cables having strands of glass fibers wound around the buffer tube. In order for such a cable to meet bend performance criteria, it has been determined that the strands of impregnated glass fibers must have a laylength of 100 mm. Additionally, the strands of glass fibers fall apart at winding rates of higher than 200 rpm. Taking these factors into consideration, the corresponding estimated line speed is 20 m/min (100 mm laylength*200 rpm). Box 40 includes four cables having strands of glass fibers wound around the buffer tube. As can be seen in box 40, the minimum mandrel diameter for achieving a successful bend test increases as the laylength and estimated processing line speed increase to 500 mm and 100 m/min, respectively.

By comparison, the inner tensile elements 16 (and outer tensile elements 20) of the disclosed drop cable 10 are more flexible than the strands of glass fiber, and therefore, longer laylengths do not affect bend performance. Indeed, point 50 corresponds to a drop cable 10 in which the inner tensile elements 16 of aramid fiber have a laylength of 1 m (i.e., "straight"), which corresponds to line speeds of 200 m/min. In order for cables using the strands of glass fiber as the inner tensile element to reach this processing line speed, the laylength has to be at least 500 mm, and the smallest mandrel to achieve a successful bend test is 180 mm (as can be seen in FIG. 3, box 40).

Utilizing the presently disclosed cable construction with the strong and flexible inner tensile elements 16, the applicant believes that processing line speeds of up to 300 m/min or higher are possible. As mentioned, this is in part related to the ability to wind the inner tensile elements 16 in longer laylengths than the currently used strands of glass fibers. Thus, in embodiments, the inner tensile element 16 has a laylength of at least 200 mm. In other embodiments, the inner tensile element 16 has a laylength of at least 500 mm, and in still other embodiments, the inner tensile element 16 has a laylength of at least 1 m. In certain embodiments, the inner tensile element 16 has a maximum laylength of no more than 5 m, and in certain other embodiments, the inner tensile element 16 has a maximum laylength of no more than 2 m.

Turning the discussion now to the exterior jacket 22, the use of more flexible inner tensile elements 16 is the result of the antibuckling properties provided by the exterior jacket 22 of the drop cable 10. In particular, the exterior jacket 22 is designed to have a low CTE so as to limit the amount of cold temperature shrinkage and warm temperature expansion of the drop cable 10. The low CTE of the exterior jacket 22 is achieved by providing a composition that includes three classes of components: a polyolefin, a thermoplastic elastomers, and an inorganic filler. While the illustrated embodiments discuss the use of a low CTE composition for the exterior jacket 22, the interior jacket 18 can also be made of the low CTE composition.

Exemplary polyolefins suitable for use in the exterior jacket 22 include one or more of medium-density polyethylene (MDPE), high-density polyethylene (HDPE), low-density polyethylene (LDPE), linear low-density polyethylene (LLDPE), and/or polypropylene (PP), amongst others. Exemplary thermoplastic elastomers suitable for use in the exterior jacket 22 include one or more of ethylene-propylene rubber (EPR), ethylene-propylene-diene rubber (EPDM), ethylene-octene (EO), ethylene-hexene (EH), ethylene-butene (EB), ethylene-vinyl acetate (EVA), and/or styrene-ethylene-butadiene-styrene (SEBS), amongst others.

The inorganic fillers have high aspect ratio and are either rod-like or plate-like. A rod-like filler includes particles that, on average, are longer than they are thick. In a particular embodiment, the rod-like filler particles have, on average, a length to thickness ratio of at least 5:1. In an embodiment, the rod-like filler includes one or more of wood flour, glass fiber, halloysite, wollastonite, magnesium oxysulfate, and/or other reinforced fibers, amongst others. A plate-like filler includes particles that, on average, are both longer and wider than they are thick. In a particular embodiment, the plate-like filler particles have, on average a length to thickness and a width to thickness of at least 5:1. In an embodiment, the plate-like filler includes one or more of mica, talc, montmorillonite, kaolinite, bentonite, synthetic clay, and/or other clays, amongst others.

The composition of the exterior jacket 22 can further include dispersants and/or compatibilizers. Such additives aid filler dispersion, improve compatibilities between polymer matrices, and stabilize the phase morphology. Exemplary compatibilizers include block copolymers that have alternating olefin block and one or more other monomer blocks, i.e., alternating block of polyethylene and styrene containing segment (compatible with SEBS). Exemplary compatibilizers also include a grafted polymer having a polyolefin backbone that is grafted with a monomer that is compatible with the used thermoplastic elastomer. In an embodiment, carbon black is added to the composition, which absorbs ultra-violet light for outdoor applications.

In an embodiment, the thermoplastic elastomer component is present in the composition of the exterior jacket 22 in an amount of less than 60% by weight. In another embodiment, the thermoplastic elastomer component is present in the composition of exterior jacket 22 in an amount of no more than 50% by weight. In still another embodiment, the thermoplastic elastomer component is present in the composition of the exterior jacket 22 in an amount of no more than 40% by weight. Further, in embodiments, the thermoplastic elastomer component is present in the composition of the exterior jacket 22 in an amount of at least 30% by weight. In embodiments, the inorganic filler is present in the composition of the exterior jacket 22 in an amount of no more than 30% by weight. In another embodiment, the inorganic filler component is present in the composition of the exterior jacket 22 in an amount of no more than 20% by weight, and in still another embodiment, the inorganic filler component is present in an amount of no more than 10% by weight. Further, in embodiments, the inorganic filler component is present in the composition of the exterior jacket 22 in an amount of at least 5% by weight. The remainder of the composition of the exterior jacket 22 includes the polyolefin component, which, in embodiments, is present in an amount of from 30% to 60% by weight, and any other additives, such as dispersants, compatibilizers, carbon black, etc. In embodiments, these other additives are present in an amount of up to 5% by weight.

In embodiments, the mechanical properties of the composition of the exterior jacket 22 include a yield stress of at least 5 MPa at 23° C., a strain break of at least 400% at 23° C., and/or an elastic modulus of less than 2000 MPa when measured at −40° C. In other embodiments, the composition of the exterior jacket 22 has a yield stress of at least 10 MPa at 23° C., a strain break of at least 600% at 23° C., and/or an elastic modulus of less than 1500 MPa when measured at −40° C. Further, in embodiments, the thermal properties of the composition of the exterior jacket 22 include an averaged coefficient of thermal expansion (CTE) of no more than 120 ($10^{-6}$) m/mK and a thermal contraction stress of 6 MPa or less. In other embodiments, the composition of the exterior jacket 22 has an averaged CTE of no more than 100 ($10^{-6}$) m/mK and/or a thermal contraction stress of 3 MPa or less. Additionally, in embodiments, the composition of the exterior jacket 22 has a melt temperature above 100° C. (i.e., at least one melt peak above 100° C. if the jacket compound has multiple melt peaks such that not all of the melt peaks must be above 100° C.).

EXAMPLES

Two exemplary polymer compositions for the exterior jacket 22 were made according to the embodiments disclosed. The first composition, Example #1, included 50% by weight of LLDPE, 40% by weight of SEBS (Kraton G1645M, available from Kraton Corporation, Houston, Tex.), 8% by weight of quaternary ammonium salt modified montmorillonite (Cloisite 15A, available from BYK Additives & Instruments, Wesel, Germany), and 2% by weight of polyethylene-grafted maleic anhydride (PE-g-MAH) used as a compatibilizer. The second composition, Example #2, included 49% by weight of MDPE, 39% by weight of SEBS, 10% by weight of quaternary ammonium salt modified montmorillonite, and 2% by weight of PE-g-MAH. Table 1 discloses the properties of these exemplary polymer compositions as compared to Comparative #1, which was 100% by weight MDPE.

TABLE 1

Properties Polymer Compositions for the Exterior Jacket of a Drop Cable

| Formulation | Elastic modulus at −40° C. (MPa) | CTE (*$10^{-6}$ m/m*K) | Contraction stress (MPa) | Elongation at Break (%) | Yield stress (MPa) |
| --- | --- | --- | --- | --- | --- |
| Example #1 | 1850 | 79.6 | 1.41 | >800 | 10.2 |
| Example #2 | 1760 | 108.2 | 2.86 | >800 | 7.8 |
| Comparative #1 | 1969 | 168.7 | 7.60 | >800 | 15.1 |

The CTE of the exemplary compositions and of the comparative example were measured using a thermomechanical analyzer (TMA). In particular, the averaged CTE was measured between −40° C. and 25° C. with the sample being heated at 2° C./minute. The elastic modulus at −40° C. was measured using a dynamic mechanical analyzer (DMA). As used herein, the thermal contraction stress refers to the stress generated by the sample when cooling from 35° C. to −40° C. The thermal contraction stress was measured on a DMA in iso-strain mode. In particular, the samples were clamped in the DMA and heated to 35° C. The clamp was locked at the initial length, and force was measured during cooling to −40° C. The samples were held at −40° C. for one hour to allow for sufficient stress relaxation. The stress after the one hour hold was reported as the thermal contraction stress. Finally, the elongation at break and the yield stress were measured according to ASTM D638.

As can be seen from Table 1, the exemplary compositions have lower elastic modulus at −40° C., a lower averaged CTE, and a lower thermal contraction stress. Thus, a drop cable 10 having an exterior jacket 22 made of one of these exemplary compositions will experience less buckling as a result of temperature fluctuations.

As disclosed herein, the combination of the exterior jacket 22, the outer tensile elements 20, and the inner tensile elements 16 allows for improved processing line speeds without sacrificing antibuckling or bend performance. In particular, by shifting the antibuckling function to the exterior jacket 22, the inner tensile elements 16 and outer tensile elements 20 are able to be selected such that long laylengths and high processing line speeds do not adversely affect the final properties of the drop cable 10. As compared to a conventional drop cable having a polyolefin jacket and strands of impregnated glass fibers wound around the buffer tube, the drop cable 10 as disclosed herein can be produced ten to fifteen times faster. The additional speed allows for the elimination of production lines, thereby saving operating and/or capital costs, or increased fiber output on the same number of production lines at a lower cost.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein the article "a" is intended include one or more than one component or element, and is not intended to be construed as meaning only one.

It will be apparent to those skilled in the art that various modifications and variations can be made without departing from the spirit or scope of the disclosed embodiments. Since modifications combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A method of manufacturing a drop cable, comprising the steps of:
    moving a buffer tube containing at least one optical fiber along a processing line at a rate of at least 200 m/min;
    winding at least one inner tensile element around the buffer tube, the at least one inner tensile element having a laylength of at least 200 mm;
    extruding an interior jacket around the at least one inner tensile element;
    running at least one outer tensile element along a longitudinal axis of the interior jacket;
    extruding an exterior jacket over or around the at least one outer tensile element, the exterior jacket comprising a polyolefin component, a thermoplastic elastomer component, and an inorganic filler component.

2. The method of claim 1, wherein after the step of extruding the exterior jacket, the at least one outer tensile element is disposed between an inner surface of the exterior jacket and an outer surface of the exterior jacket, the inner surface of the exterior jacket contacting the interior jacket of the drop cable.

3. The method of claim 1, further comprising the step of selecting at least one of an aramid, a carbon fiber, an ultra-high molecular weight polyethylene, an ethylene chlorotrifluoroethylene, a polybenzimidazole, a perfluoroalkoxy, a polytetrafluoroethylene, a polyphenylene sulfide, a liquid crystal polymer, or a polyphenylene benzobisoxazole for use as filaments in the at least one the inner tensile element and in the at least one outer tensile element.

4. The method of claim 1, further comprising the step of selecting the exterior jacket to have a composition of from 30% to 60% by weight of the thermoplastic elastomer component, from 5% to 30% by weight of the inorganic filler component, and with a remainder being the polyolefin component and other additives.

5. A cable, comprising:
    at least one conductor;
    a buffer tube surrounding the at least one conductor;
    a first plurality of inner tensile elements, wherein the first plurality of inner tensile elements are wound around the buffer tube at a laylength of at least 500 mm;
    an interior jacket disposed around the first plurality of inner tensile elements;
    a second plurality of outer tensile elements; and
    an exterior jacket having an outer surface defining an outermost surface of the cable, the exterior jacket comprising:
        from 30 wt % to 60 wt % of at least one polyolefin;
        from 30 wt % to 60 wt % of at least one thermoplastic elastomer; and
        from 5 wt % to 30 wt % of at least one inorganic filler;

wherein the second plurality of outer tensile elements is disposed between the outer surface of the exterior jacket and the interior jacket.

6. The cable of claim 5, wherein the first plurality of inner tensile elements and the second plurality of outer tensile elements comprises at least one of an aramid, a carbon fiber, an ultra-high molecular weight polyethylene, an ethylene chlorotrifluoroethylene, a polybenzimidazole, a perfluoroalkoxy, a polytetrafluoroethylene, a polyphenylene sulfide, a liquid crystal polymer, or a polyphenylene benzobisoxazole.

7. The cable of claim 5, wherein the at least one polyolefin includes at least one of medium-density polyethylene, high-density polyethylene, low-density polyethylene, linear low-density polyethylene, or polypropylene; and wherein the at least one thermoplastic elastomer includes at least one of ethylene-propylene rubber, ethylene-propylene-diene rubber, ethylene-octene, ethylene-hexene, ethylene-butene, ethylene-vinyl acetate, or styrene-ethylene-butadiene-styrene.

8. The cable of claim 5, wherein the exterior jacket further comprises an inner surface and wherein the second plurality of outer tensile elements are disposed between the inner surface and the interior jacket.

9. The cable of claim 5, wherein the exterior jacket further comprises an inner surface and wherein the second plurality of outer tensile elements is disposed between the inner surface and the outer surface such that the second plurality of outer tensile elements is embedded within the exterior jacket.

\* \* \* \* \*